UNITED STATES PATENT OFFICE.

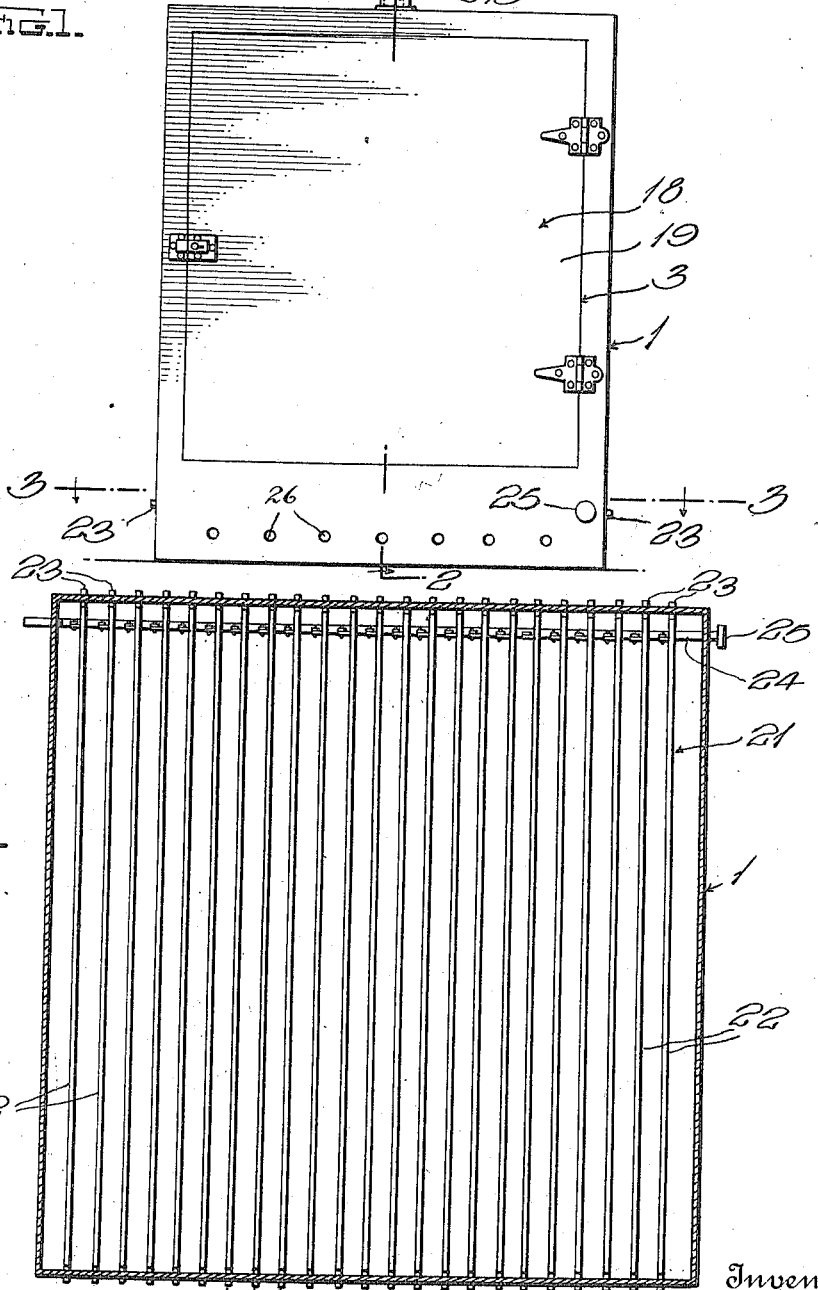

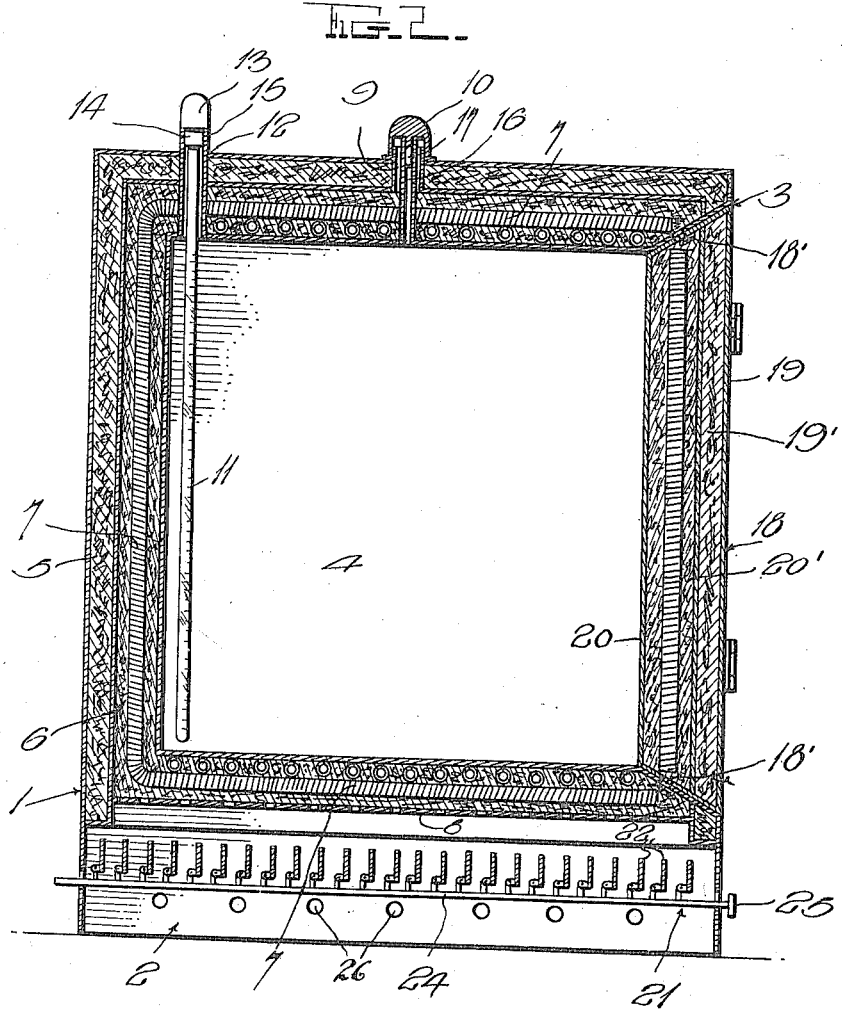

NELSON A. McQUESTON, OF MANSFIELD, OHIO; LAURA H. McQUESTON, ADMINISTRATRIX OF SAID NELSON A. McQUESTON, DECEASED, ASSIGNOR TO LAMBERT H. McQUESTON, OF MANSFIELD, OHIO.

FIRELESS COOKER.

1,234,059. Specification of Letters Patent. Patented July 17, 1917.

Application filed March 16, 1916. Serial No. 84,651.

*To all whom it may concern:*

Be it known that I, NELSON A. McQUESTON, a citizen of the United States, residing at Mansfield, in the county of Richland and State of Ohio, have invented certain new and useful Improvements in Fireless Cookers; and I do declare the following to be a full, clear, and exact description of the invention, such as will enable others skilled in the art to which it appertains to make and use the same.

This invention relates to improvements in fireless cookers.

The principal object of the invention is to provide a device of this character in which the heat retaining substance remains at all times within the casing surrounding the cooking chamber, in other words, the usual heat retaining material is heated while in the cooker without the necessity of removing the same.

With this general object in view, my invention relates in the novel features of construction, combination and arrangement of parts which will hereinafter be more particularly described and claimed and shown in the drawings wherein:

Figure 1 represents a front elevation of my improved cooker;

Fig. 2 is a vertical transverse section taken on the line 2—2 of Fig. 1; and

Fig. 3 is a horizontal section taken on the line 3—3 of Fig. 1.

In its preferred embodiment, my improved cooker comprises an outer preferably metallic casing 1, open at its bottom as shown at 2 and on one side to provide a door opening 3, in which is disposed a cooking chamber 4 also preferably of metal, such as aluminum, said chamber being spaced from the walls of the casing 1 and provided with a door opening alined with the opening 3. The inner walls of the casing 1 are provided with a heat insulating space 5 which is filled with asbestos or other non-conductor of heat. This material may be applied to the walls of the casing in any preferred manner, but the lower portions of the sides thereof terminate at points spaced from the bottom of the side walls of the casing as shown in the transverse sectional view.

The space between the walls of the cooking chamber 4 and the casing 1 is filled with a heat retaining substance such as broken pumice stone, soap stone, slag, cement or fire clay, or other suitable material designated by the numeral 6 through which is interspersed numerous coils 7 of iron wire. This heat retaining substance may be either granular or solid, but in both cases is permeable to allow heated air to pass from the stove (not shown) through the open bottom 2 of the casing and to circulate therethrough. The material 6 which is disposed beneath the bottom of the cooking chamber 4 is held in place by a perforated sheet metal plate 8 through which the air can readily pass into the heat retaining space, and after circulating through the permeable substance therein, may pass out through a vent 9 in the top of the casing 1.

As the air passes upwardly, the heat is transmitted to the substance therein and to the coils of wire 7, and this heat is stored up so that it may cook the food in the chamber 4. By providing the coils 7, the heat is more quickly transmitted to all parts of the heat retaining space than is possible by merely allowing the heated air to circulate throughout the broken pumice stone or other substance. In this way, the substance at the top of the cooker will become as effectively heated as that closer to the fire.

After the heat retaining material has been raised to a sufficient temperature, a cap 10 is placed on the vent 9 and thus prevents further circulation of air through the substance. To determine whether the heat retaining material has been heated to a sufficient degree, a thermometer 11 is inserted through an opening 12 in the casing 1 and into the cooking chamber 4, the upper end of said thermometer being provided with a knob 13 which has a reduced portion 14 for engagement with a collar 15 surrounding the opening 12 in the casing 1 so that steam from the interior of the cooking chamber cannot escape. An additional outlet is provided for the cooking chamber in the form of a vent 16 which extends from the top thereof and into the vent 9, thus permitting the two vents to be simultaneously closed by the cap 10. This cap is substantially cylindrical in shape with a closed end, and has depending from said end a stopper 17 which serves to seal the vent 16 while the cylindrical portion closes the vent 9.

The opening 3 in the casing 1 in the cooking chamber 4 is normally closed by a door 18 which comprises an outer portion 19 containing the heat insulating substance 19' such as covers the inner walls of the casing 1, and a plate 20 spaced from the outer portion 19 to provide a cavity for the heat retaining substance 20' simliar to that which surrounds the cooking chamber, said door being hinged by the outer portion 19 to the casing 1. Openings 18' are formed in the edges of the heat retaining cavity of the door and in the edges of the similar chamber in the casing 1 to allow the heated air to circulate through the substance 20'.

The bottom of the casing 1 is provided with a damper 21 which is formed of a plurality of shutter plates 22 having pivot studs 23 formed on their opposite edges and pivotally mounted in the walls of the lower portion of the casing below the perforated plate 8. This damper is also disposed below the lower ends of the space 5 filled with the heat insulating material and is adapted to coact with the cap on the vent 9 to prevent the heated air contained in the heat retaining material from escaping after the cooker is in operation. Each of the plates 22 is pivotally connected to an operating rod 24 which extends through one wall of the casing and is provided with a handle 25 by which it may be operated.

The complete device as above described is either normally connected with a stove or other form of heater, or may be constructed so that it can be carried from place to place and only disposed on the stove when it is desired to heat the heat retaining substance 6; or the device may be very readily equipped with electrical means for supplying the necessary heat to raise the substance 6 to the proper temperature. Whichever method is used, the damper 21 is opened and the shutter plates 22 moved to a vertical position to allow the heated air from the stove to pass therethrough, through the perforated plate 8, and into the space occupied by the substance 6 when it is desired to operate the cooker. The necessary amount of air to be heated is supplied through the perforations 26 formed in the sides of the casing 1 below the damper, the cap 10 being removed to allow this air to freely circulate between the walls of the cooking chamber and the casing 1. When, however, the heat retaining substance has been sufficiently heated, the cap 10 is replaced on the vent 9 and the shutter plates moved by the operating rod 24 to dispose them in substantially horizontal position, thereby closing the damper to retain the heat within the casing. The cooker can then be removed from the stove, or if it forms a part of the stove, the application of heat thereto may be discontinued, but the food within the cooking chamber will be continuously heated until sufficiently cooked by the heat which is retained in the material surrounding the chamber and in the wire coils interspersed therethrough.

From the foregoing description, it will be seen that I have invented a very simple cooker which will effectively cook the food contained therein even after the application of heat is discontinued, the only heat required being that necessary to raise the heat retaining substance to a sufficient degree. This will obviously be a big saving in the cost of fuel since none of the heated air from the stove escapes into the surrounding atmosphere, but passes upward through the heat retaining substances.

Various changes may be made in the form and proportion of the cooker without departing from the spirit or sacrificing any of the principles of the invention as defined in the following claims.

I claim as my invention:

1. In a device of the class described, a casing open at its bottom, a vent in the top thereof, a cooking chamber disposed in said casing and spaced from the walls thereof, permeable heat retaining material surrounding said chamber adapted to have heated air circulate therethrough, and metallic strips extending from the top to the bottom of said casing and interspersed through said permeable material, said strips permitting the flow of gases therebetween.

2. In a device of the class described, a casing open at its bottom, a vent in the top thereof, a cooking chamber disposed in said casing and spaced from the walls thereof, permeable heat retaining material surrounding said chamber and adapted to have heated air circulate therethrough, and metal coils interspersed through said permeable material, said coils permitting the flow of gases therebetween.

3. In a device of the class described, a casing open at its bottom, a vent in the top thereof, heat insulating material covering the walls of said casing, a cooking chamber disposed therein and spaced from the walls thereof, permeable heat retaining material surrounding said chamber and adapted to have heated air circulate therethrough, and metallic strips interspersed through said permeable material, said strips permitting the flow of gases therebetween.

4. In a device of the class described, a casing open at its bottom, a vent in the top thereof, a cooking chamber disposed therein and spaced from the walls thereof, a vent in said chamber and communicating with the first mentioned vent, permeable heat retaining material surrounding said chamber and adapted to have heated air circulate therethrough, and a removable closure for said vents adapted to simultaneously close the same to retain the heat within the casing.

5. In a device of the class described, a casing open at its bottom, a vent in the top thereof, a cooking chamber disposed therein and spaced from the walls thereof, an additional vent extending from said damper and disposed within the other vent, a removable cap for closing the first mentioned vent, a depending stopper within said cap whereby the additional vent is closed when the cap is disposed on the other, and permeable heat retaining material surrounding said chamber.

In testimony whereof I have hereunto set my hand in presence of two subscribing witnesses.

NELSON A. McQUESTON.

Witnesses:
 L. H. BEAM,
 M. O. DOOLITTLE.

Copies of this patent may be obtained for five cents each, by addressing the "Commissioner of Patents, Washington, D. C."